United States Patent
Gaither

(10) Patent No.: US 9,384,175 B2
(45) Date of Patent: Jul. 5, 2016

(54) DETERMINATION OF DIFFERENCES BETWEEN ELECTRONIC DOCUMENTS

(75) Inventor: Shawn A. Gaither, Raleigh, NC (US)

(73) Assignee: Adobe Systems Incorporated, San Jose, CA (US)

( * ) Notice: Subject to any disclaimer, the term of this patent is extended or adjusted under 35 U.S.C. 154(b) by 1652 days.

(21) Appl. No.: 12/033,505

(22) Filed: Feb. 19, 2008

(65) Prior Publication Data

US 2014/0032513 A1 Jan. 30, 2014

(51) Int. Cl.
*G06F 17/30* (2006.01)
*G06F 17/22* (2006.01)
*G06F 11/30* (2006.01)

(52) U.S. Cl.
CPC ...... *G06F 17/2211* (2013.01); *G06F 17/30985* (2013.01); *G06F 11/3072* (2013.01); *G06F 2207/025* (2013.01)

(58) Field of Classification Search
CPC ............ G06F 17/2211; G06F 11/3072; G06F 2207/025; G06F 17/30985
USPC ............ 707/999.003, 999.006, 999.007, 723, 707/727, 728, 730, 735, 736, 758, 778, 780, 707/797, 706, 707, 687, 690
See application file for complete search history.

(56) References Cited

U.S. PATENT DOCUMENTS

| | | | | |
|---|---|---|---|---|
| 5,559,721 | A * | 9/1996 | Ishii | 709/206 |
| 5,581,752 | A * | 12/1996 | Inoue | G06F 17/30017 345/636 |
| 6,240,409 | B1 * | 5/2001 | Aiken | |
| 6,324,555 | B1 * | 11/2001 | Sites | G06F 17/21 707/E17.008 |
| 6,366,933 | B1 * | 4/2002 | Ball et al. | 715/203 |
| 6,560,620 | B1 * | 5/2003 | Ching | 715/229 |
| 6,826,568 | B2 * | 11/2004 | Bernstein et al. | |
| 6,848,078 | B1 * | 1/2005 | Birsan et al. | 715/206 |
| 7,373,613 | B2 * | 5/2008 | Pohlan | 715/853 |
| 7,386,835 | B1 * | 6/2008 | Desai et al. | 717/117 |
| 7,437,664 | B2 * | 10/2008 | Borson | 715/234 |
| 7,502,995 | B2 * | 3/2009 | Takagi et al. | 715/234 |
| 7,694,217 | B2 * | 4/2010 | Croft et al. | 715/229 |
| 8,587,613 | B2 * | 11/2013 | Wang | G06K 9/00442 345/156 |

(Continued)

OTHER PUBLICATIONS

"PDF Reference: Sixth Edition", *Adobe Portable Document Format Version 1.7*, (Nov. 2006), 1310 pgs.

(Continued)

*Primary Examiner* — Thanh-Ha Dang
(74) *Attorney, Agent, or Firm* — Shook, Hardy & Bacon L.L.P.

(57) ABSTRACT

In some example, a computerized method includes receiving a first electronic document and a second electronic document. The method also includes determining a difference between the first electronic document and the second electronic document based on matching of a component of the first electronic document to a component of the second electronic document in a hierarchical order. The method includes storing the difference in a machine-readable medium.

12 Claims, 6 Drawing Sheets

(56) References Cited

U.S. PATENT DOCUMENTS

| | | |
|---|---|---|
| 2004/0083091 A1 | 4/2004 | Ie et al. |
| 2006/0004817 A1* | 1/2006 | Andrews ................. 707/101 |
| 2006/0044619 A1* | 3/2006 | Namiki ............. G06F 17/242 358/3.28 |
| 2006/0271846 A1* | 11/2006 | Nickolov ............ G06Q 10/10 715/235 |
| 2006/0282475 A1* | 12/2006 | Suermondt et al. .......... 707/201 |
| 2007/0046957 A1* | 3/2007 | Jacobs et al. .................. 358/1.9 |
| 2007/0112898 A1* | 5/2007 | Evans et al. ................. 707/205 |
| 2007/0208998 A1* | 9/2007 | Cicerone .................... 715/531 |
| 2008/0092034 A1* | 4/2008 | Lim et al. .................... 715/234 |
| 2008/0178074 A1* | 7/2008 | Stallings ............... G06F 17/211 715/249 |
| 2008/0259410 A1* | 10/2008 | Saito ................. H04N 1/00795 358/450 |
| 2009/0161146 A1* | 6/2009 | Ireland ................. G06F 17/211 358/1.15 |

OTHER PUBLICATIONS

Myers, Eugene. W, "An O(ND) difference algorithm and its variations", *Algorithmica vol. 1*, (Nov. 1986), 15 pgs.

\* cited by examiner

DETERMINATION OF DIFFERENCES BETWEEN ELECTRONIC DOCUMENTS

COPYRIGHT

A portion of the disclosure of this document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screenshots which may be described below and in the drawings that form a part of this document: Copyright © 2008, Adobe Systems Incorporated. All Rights Reserved.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Across different versions of an electronic document, content may be inserted, deleted, moved, etc. Comparison of different versions of an electronic document enables such changes to be determined. However, conventional approaches are limited. In particular, conventional approaches may only provide visual or word-only differencing across versions of an electronic document.

BRIEF DESCRIPTION OF THE DRAWINGS

The embodiments are provided by way of example and not limitation in the figures of the accompanying drawings, in which like references indicate similar elements and in which.

DETAILED DESCRIPTION

Figure 1:
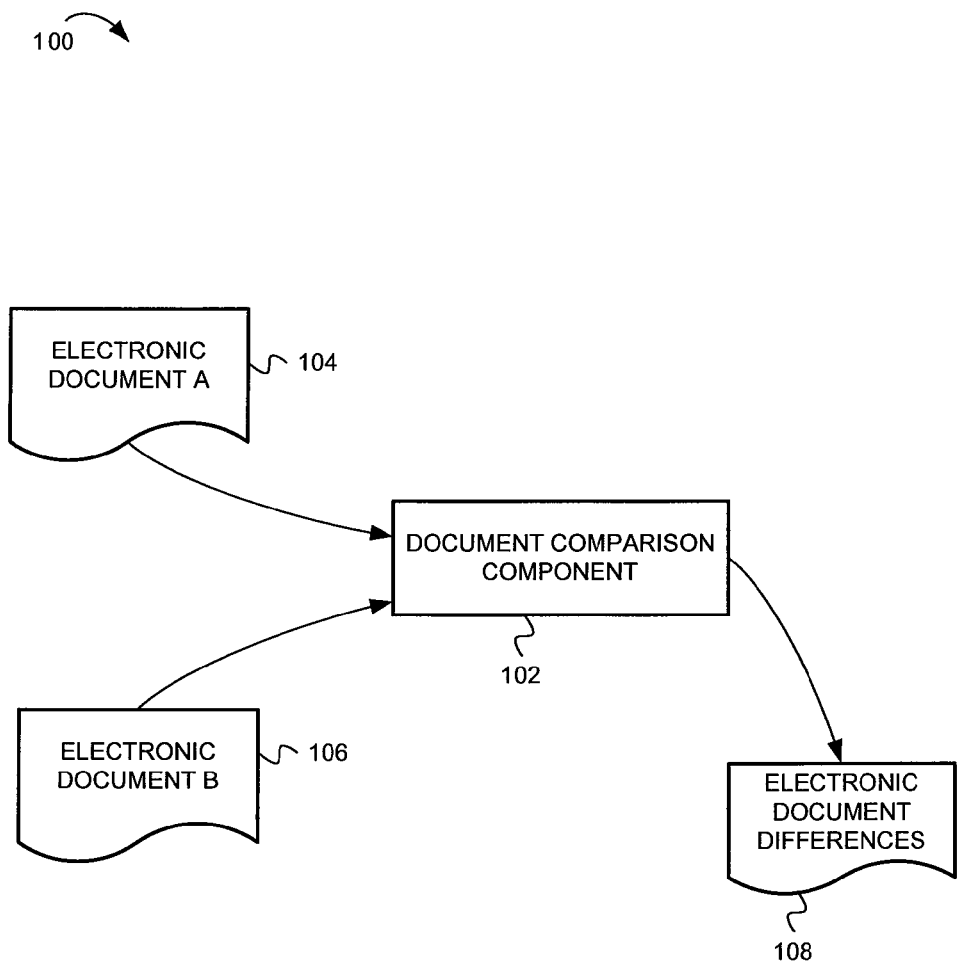
FIG. 1 is a system diagram for determining differences between electronic documents, according to some example embodiments.

Methods, apparatus and systems for determination of electronic document differences are described. In the following description, numerous specific details are set forth. However, it is understood that embodiments of the invention may be practiced without these specific details. In other instances, structures and techniques have not been shown in detail in order not to obscure the understanding of this description.

As used herein, the term "electronic document" may comprise any type of electronic content for use in electronic form. Examples of an electronic document may comprise Portable Document Format ("PDF") which may be viewed and modified in one of the ADOBE® ACROBAT® programs, a web page, a word processing document (such as a Microsoft® Word document), a spread sheet document, page-descriptive electronic content, hypertext document, a markup language document, declarative specification document (such as for example a hypertext markup language HTML or XML document), a fillable form or data describing application graphical user interface, etc.

As used herein, the term "single-page mode" may comprise a mode for an electronic document wherein each page is considered a complete entity of information (although the electronic document may include multiple pages). An electronic document that includes a slide presentation is one example of an electronic document having a single-page mode. Accordingly, each page or slide may be considered a sub-document.

As used herein, the term "continuous mode" may comprise a mode for an electronic document wherein the data therein carries across pages. One example of such an electronic document is a word processing document where the different components of the electronic document (e.g., paragraphs, sentences, words, etc.) carry across more than one page in the electronic document.

As used herein, the term "hierarchical order" may comprise any type of order relative to a hierarchy tree. For example, the hierarchical order may be a top-down hierarchical order, wherein nodes of a hierarchy tree are traversed starting at the root node, traversing different branch nodes and down to the leaf nodes. In another example, the hierarchical order may be a bottom-up hierarchical order, wherein nodes of a hierarchy tree are traversed starting at the leaf nodes, traversing different branch node and up to the root node.

Example embodiments may be used to determine the differences between two or more electronic documents. In some example embodiments, the differences between two or more electronic documents include a hierarchical representation. In some example embodiments, at a higher level, differences among pages of the electronic documents are provided. At lower levels, differences in paragraphs, words, etc. may also be provided. Some example embodiments may operate in continuous mode. Alternatively or in addition, some example embodiments may operate in single-page mode. Some example embodiments may include difference in content, attributes, metadata, etc. Moreover, some example embodiments may include partial matching to track relocation and modification of certain content. In some example embodiments, the type for the two electronic documents being compared may or may not be the same. For example, a first electronic document may be a word processing document and the second electronic document may be a PDF document.

FIG. 1 is a system diagram for determining differences between electronic documents, according to some example embodiments. A system 100 comprises a document comparison component 102. The system 100 also comprises electronic documents to be input into the document comparison component 102. Document A 104 and document B 106 are input into the document comparison component 102. As further described below, the document comparison component 102 processes the document A 102 and the document B 106 to determine the differences between the electronic documents. The document comparison component 102 outputs document difference 108, which are the differences between the document A 104 and the document B 106.

In some example embodiments, the document comparison component 102, the documents, and the document differences may be stored on a same or different machine-readable medium. Alternatively, all or some may be stored in different machine-readable media. For example, the document A 104 and the document B 106 may be stored in different machine-readable media on remote servers that are accessed by the document comparison component 102. The document comparison component 102 may then output the document differences 108 for storage on a local or remote machine-readable media. The document comparison component 102 may be software, hardware, firmware or a combination thereof for executing operations, according to some example embodiments.

The machine-readable media that store the data and components described above includes any mechanism which provides (i.e., stores and/or transmits) information in a form accessible by a machine (e.g., a computer, a network device, a personal digital assistant, manufacturing tool, any device with a set of one or more processors, etc.). In some example embodiments, the machine-readable media includes volatile and/or non-volatile media (e.g., read only memory (ROM), random access memory (RAM), magnetic disk storage media, optical storage media, flash memory devices, etc.).

Figure 2:
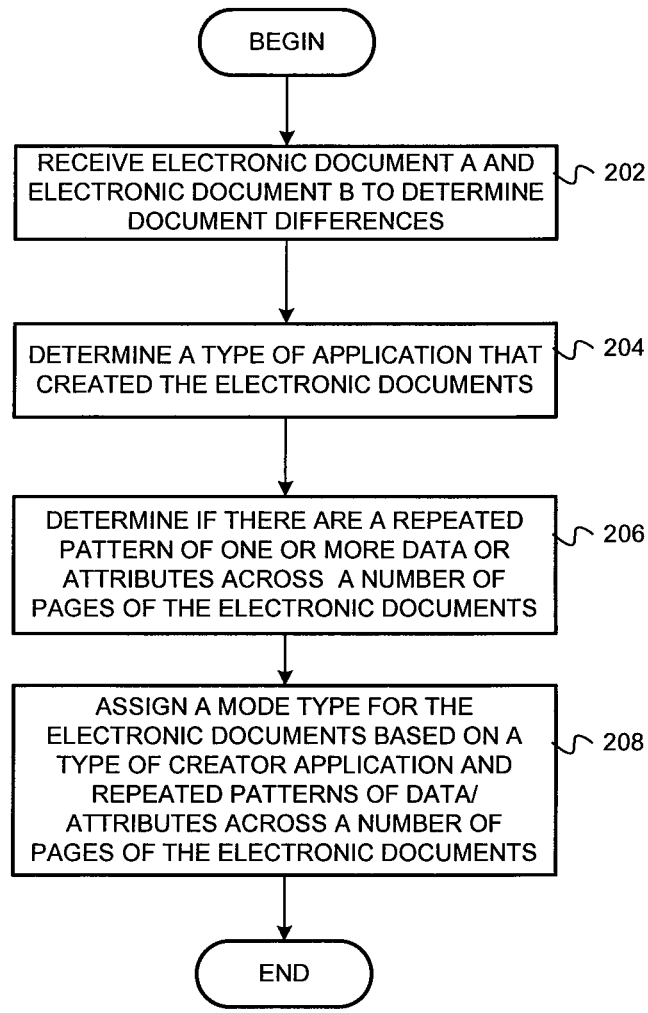
FIG. 2 is a diagram of a method for determining a mode type for determining differences between two electronic documents, according to some example embodiments.
Figure 3:
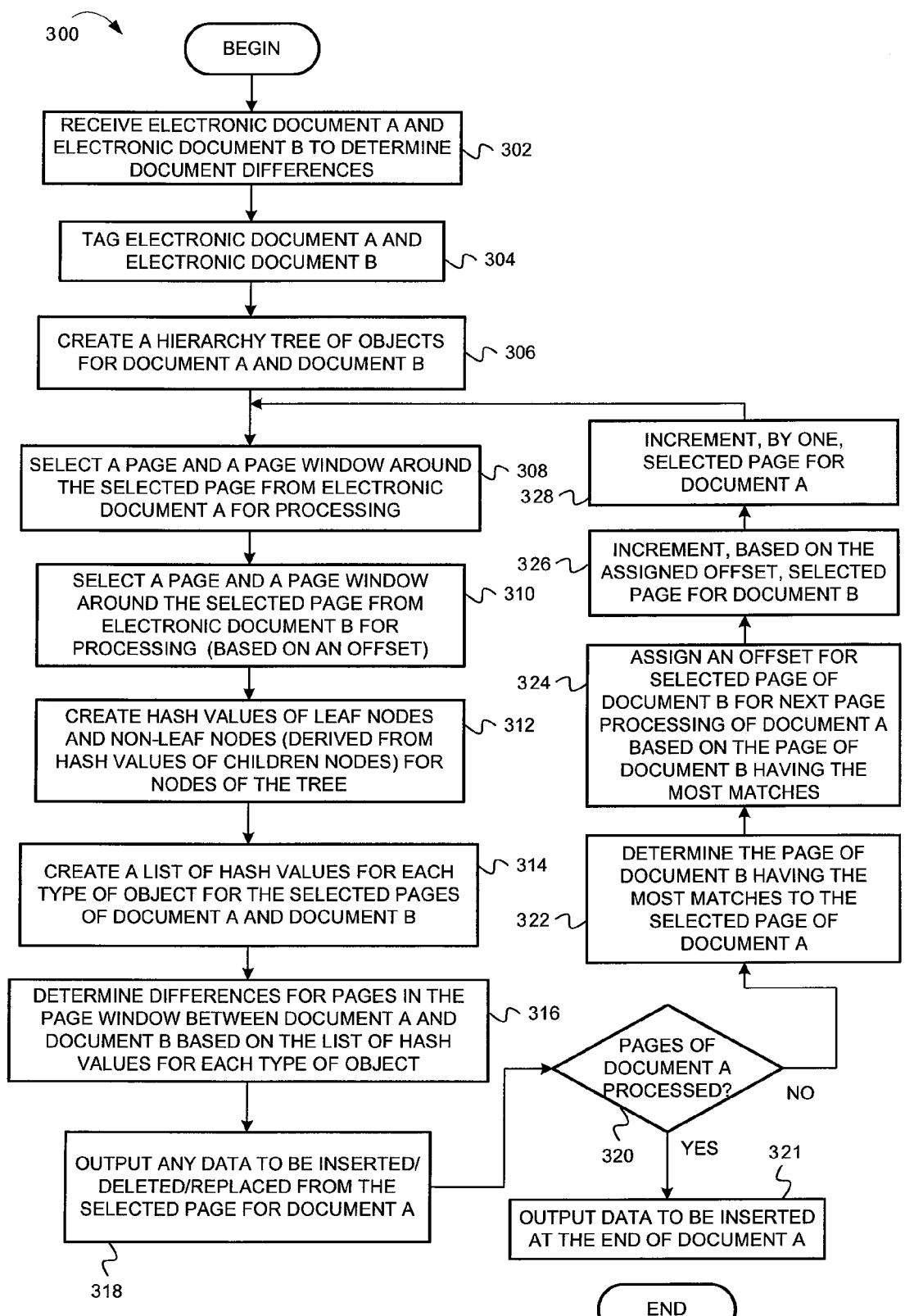
FIG. 3 is a diagram of a method for determining differences between two electronic documents in a continuous mode, according to some example embodiments.
Figure 4:
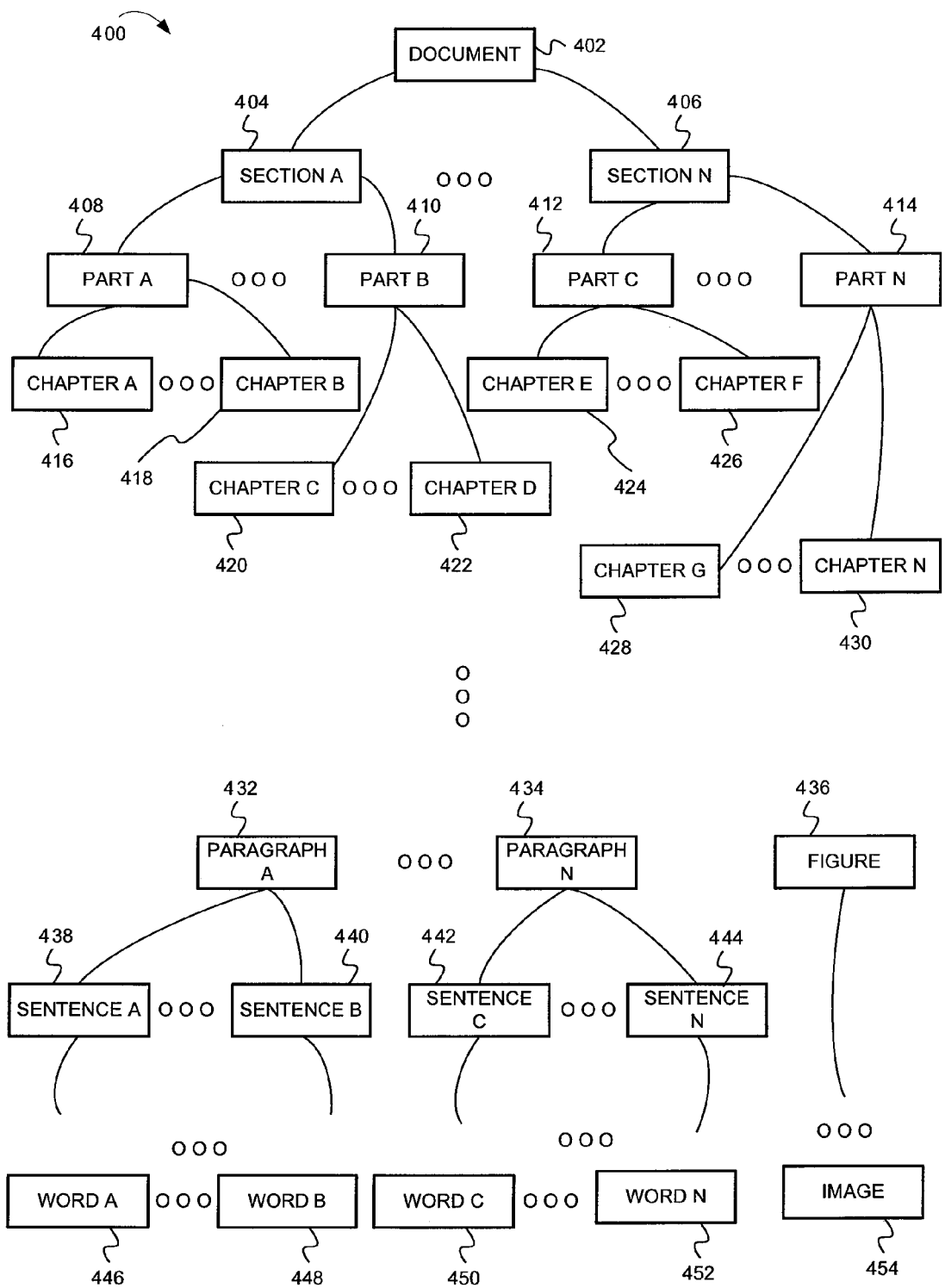
FIG. 4 illustrates an example structure tree for an electronic document, according to some example embodiments.

Operations, according to example embodiments, are now described. In certain embodiments, the operations are performed by instructions residing on machine-readable media (e.g., software), while in other embodiments, the methods are performed by hardware or other logic (e.g., digital logic). In some example embodiments, the electronic documents may be processed differently depending on the mode type for the electronic documents. In some example embodiments, the mode type may be a continuous mode or a single-page mode (see description above). FIG. 3 and FIG. 4 illustrate methods for determining document differences based on the electronic documents being in a continuous mode and a single-page mode, respectively. FIG. 2 is a diagram of a method for determining a mode type for determining differences between two electronic documents, according to some example embodiments. Accordingly, the output from the method of FIG. 2 may determine which of the two methods (FIG. 3 or FIG. 4) may be used to determine the difference between electronic documents. A method 200 is described with reference to FIG. 1. In some example embodiments, the method 200 is performed by the document comparison component 102. While described with reference to two electronic documents, in some example embodiments, such operations may be performed on any number of such electronic documents. The method 200 commences at block 202.

At block 202, the document comparison component 102 receives the electronic document A 104 and the electronic document B 106. As described above, these documents may be received from local and/or remote machine-readable media. The method continues at block 204.

At block 204, the document comparison component 102 determines a type of application that created the electronic documents. For example, different types of word processing applications, application that creates slide presentations, etc. may be used to create the electronic documents. In some example embodiments, the metadata for the electronic documents include the type of application used to create the electronic documents. The type of application used to create the electronic document is a good indicator of the type of mode that should assigned to the electronic documents. For example, if some type of word processing application is the creator, then the electronic document is assigned as a continuous mode. In particular (as described above), word processing documents generally have components (such as paragraphs, sentences, words, etc.) that flow across multiple pages. If some type of application that creates slide presentations is the creator, then the electronic document is assigned as a single-page mode. In particular (as described above), slide presentations generally have components that are contained on a single page. The method continues at block 206.

At block 206, the document comparison component 102 determines if there is a repeated pattern for one or more data or attributes for a number of pages of the electronic documents. In particular, if certain data or format is repeated on a number of the pages, it is assumed that the pages have components that are contained on a single page. Accordingly, the electronic documents are assigned as a single-page mode. If certain data or format is not repeated on a number of pages, it is assumed that the pages have components that are not contained on a single page. Thus, such electronic documents are assigned as a continuous mode. In some example embodiments, if the data at certain locations on the pages have font sizes that exceed a threshold, it is assumed that the electronic document is a series of slides. In particular, a slide presentation generally has data with large font sizes at the top of each page. In some example embodiments, if a same or similar background is used on the pages of the electronic document, it is assumed that the electronic document is a series of slides. Other indicators that an electronic document should be assigned as a single-page mode include bulleted data on the pages, a standard mark (such as some type of corporate trademark) on the pages, etc. The method continues at block 208.

At block 208, the document comparison component 102 assigns a mode type for the electronic documents based on at least one of the type of creator application and the repeated pattern of one or more attributes on the pages of the electronic document (as described above). For example, in some example embodiments, the document comparison component 102 assigns the electronic documents to be in a single-page mode if the creator application is a particular type and there is a repeated pattern for at least two attributes across a majority of the pages of both electronic documents to be compared. Otherwise, the document comparison component 102 assigns the electronic documents to be in a continuous mode. In some example embodiments, if the electronic document is in a continuous mode, the document comparison component 102 performs the operations as described in FIG. 3. In some example embodiments, if the electronic document is in a single-page mode, the document comparison component 102 performs the operations as described in FIG. 5.

FIG. 3 is a diagram of a method for determining differences between two electronic documents in a continuous mode, according to some example embodiments. A method 300 is described with reference to FIG. 1. In some example embodiments, the method 300 is performed by the document comparison component 102. While described with reference to two electronic documents, in some example embodiments, such operations may be performed on any number of such electronic documents. The method 300 commences at block 302.

At block 302, the document comparison component 102 receives the electronic document A 104 and the electronic document B 106. As described above, these documents may be received from local and/or remote machine-readable media. The method continues at block 304.

At block 304, the document comparison component 102 tags the electronic document A and the document B. In some example embodiments, the document comparison component 102 locates a hierarchical structure of containers for pages of an electronic document. In some example embodiments, as a result of the tagging, the document comparison component 102 outputs a tree that provides a hierarchy structure of different components of an electronic document. For example, the document comparison component 102 may locate chapters, sections, paragraphs, sentences, words, images, etc. of an electronic document. In some example embodiments, the document comparison component 102 may perform the tagging and creation of the associated structure tree in accordance with PDF Reference, 6$^{th}$ edition, version 1.7, November 2006 from Adobe Systems Inc., which is hereby incorporated by reference. In some example embodiments, the document comparison component 102 may initially tag individual pages of an electronic document. The document comparison component 102 may then reprocess the document to tag parts of the document that span over multiple pages of an electronic document (e.g., chapters, sections, paragraphs, etc.). The method continues at block 306.

At block 306, the document comparison component 102 creates a hierarchy tree of objects for document A and document B. The document comparison component 102 may create the hierarchy tree from the tagging of the electronic document described at block 304 (described above).

FIG. 4 illustrates an example hierarchy tree for an electronic document, according to some example embodiments. As shown, FIG. 4 includes a hierarchy tree 400 that includes different components of an electronic document. A root 402 of the hierarchy tree 400 is the document. Below the root 402 are different parts of an electronic document that are hierarchically ordered. Embodiments are not limited to the components of an electronic document illustrated in the hierarchy tree 400, as any type of component of an electronic document may be incorporated into different example embodiments. For example, FIG. 4 illustrates the top and bottom part of the hierarchy tree 400. However, additional components of an electronic document may be included between these parts of the hierarchy tree 400.

In the top part of the hierarchy tree 400, a section A 404 and a section N 406 are child nodes of the root 402. A part A 408 and a part B 410 are child nodes of the section A 404. A part C 412 and a part N 414 are child nodes of the section N 406. A chapter A 416 and a chapter B 418 are child nodes of the part A 408. A chapter C 420 and a chapter D 422 are child nodes of the part B 410. A chapter E 424 and a chapter F 426 are child nodes of the part C 412. A chapter G 428 and a chapter N 430 are child nodes of the part N 414.

In the bottom part, the hierarchy tree 400 includes a paragraph A 432, a paragraph N 434 and a figure 436. A sentence A 438 and a sentence B 440 are child nodes of the paragraph A 432. A sentence C 442 and a sentence N 444 are child nodes of the paragraph N 434. An image 454 is a child node of the figure 436. As shown, the sentences A-N 438-444 include a number of child nodes that are words within such sentences. This is illustrated by a word A 446, a word B 448, a word C 450 and a word N 452. Embodiments are not limited to the components illustrated in FIG. 4. For example, additional types of leaf nodes may include vector graphics and different types of external objects (e.g., annotations, metadata, etc). In some example embodiments, a hierarchy tree may be created for each page of the electronic document. Thus, the root of the hierarchy tree would be the page. Returning to FIG. 3, the method continues at block 308.

At block 308, the document comparison component 102 selects a page and a page window around the selected page from electronic document A for processing. In some example embodiments, the document comparison component 102 selects the page in numerical order (1, 2, 3, . . . ). The page window may comprise a number of pages on both or one side of the selected page. To illustrate the page window, if the size of the page window equals 7 and the selected page equals 1, then the pages in the window include 1-8. If the selected page equals 10, then the pages in the window include 3-17. In some example embodiments, the size of the page window is static, depending on which selected page is being processed. Returning to the example where the selected page equals 1, then the pages in the window include 1-15. If the selected page equals 2, the pages in the window include 2-15; if the selected page equals 3, the pages in the window include 3-15, etc. Such embodiments enables data (that was added at the beginning of a document) to fall within the page window and be processed accordingly. The size of the page window may range from one to the number of pages in the document. In some example embodiments, the page window may equal the number of pages in the document. The method continues at block 310.

At block 310, the document comparison component 102 selects a page and a page window around the selected page from electronic document B for processing based on an offset. In some example embodiments, the document comparison component 102 selects the page in numerical order (1, 2, 3, . . . ). As further described below, for document B, an offset may be used to attempt to pair the page for processing from the electronic document A with the page from the electronic document B. In some example embodiments, the initial value for the offset equals zero. After processing of a page, the offset is determined based on the results of such processing. A more detailed description of the determination of this offset is set forth below. Similar to the electronic document A, a page window is selected for electronic document B (as described for document A). The page window for the electronic document A may or may not be equal to the page window for the electronic document B. The method continues at block 312.

At block 312, the document comparison component 102 creates hash values for the nodes of the hierarchy tree for the pages in the page window for document A and document B. The document comparison component 102 may use any number of different types of hashing operations to create the hash values (such as Message Digest (MD)2, MD4, MD5, Secure Hash Algorithm (SHA), etc.). In some example embodiments, the document comparison component 102 may first create hash values for each of the leaf nodes (words, images, etc. of the document). The hash value may be created from any data that is representative of the leaf node. In some example embodiments, the hash value may be derived from content, attributes, metadata, etc. for the node. For example, for a word, the hash may be derived from the word itself, the font, the color, etc. In some example embodiments, the document comparison component 102 may then derive the hash values for the non-leaf nodes from the hash values of the leaf nodes. Therefore, for a non-leaf node having three leaf nodes, the document comparison component 102 would derive the hash value for the non-leaf node using the hash values for the three leaf nodes. Accordingly, the document comparison component 102 may traverse up the hierarchy tree to create the hash values for the different nodes based on the hash values of child nodes. Therefore, if the hash value for a given page of document A equals the hash value for a given page of document B, it is assumed that these two pages are the same. In some example embodiments, the document comparison component 102 may verify a match of two hash values based on the hash value of the child nodes. For example, if the hash values match for two pages, the hash values for the paragraphs on the pages are compared to determine if such values match. The method continues at block 314.

At block 314, the document comparison component 102 creates an ordered list of hash values for the different types of objects for the pages in the page window for document A and document B. As described above, objects in an electronic document may include word, graphic object, figure, sentence, paragraph, chapter, section, etc. The document comparison component 102 may store the hash values in any type of data structure (e.g., skip list, array, table, etc.).

In some situations, a given object may have small updates therein. For example, only one word in a paragraph may be changed and the paragraph moved. In some example embodiments, the document comparison component 102 may locate such objects. In some example embodiments, the document comparison component 102 processes the non-matching branch objects to see if such objects are near match objects. The document comparison component 102 may traverse the hierarchy tree of document A to locate branch objects in document B, wherein some minimum percentage matching children are located. Accordingly, another object to be tracked may be near match objects (similar to words, sentences, paragraphs, etc.) The method continues at block 316.

At block 316, the document comparison component 102 determines differences for the pages in the page window between document A and document B based on the list of hash values for each type of object. In some example embodiments, the document comparison component 102 performs a comparison of hash values between the documents starting with the highest level objects. For example, the document comparison component 102 may start with a comparison of hash values for pages between document A and document B. If there is match between two pages, the lower level objects (e.g., paragraphs, sentences, words, etc.) for those two matching pages do not need to be processed. If a given page does not have a match, the document comparison component 102 may then perform a comparison for the next lower level of objects. In some example embodiments, the document comparison component 102 continues comparison of hash values for same type objects for document A and document B for the non-leaf objects (but not the leaf objects). For example, if the leaf objects are words, the document comparison component 102 does not compare the hash values for words between document A and document B.

The document comparison component 102 may then create an array for document A and document B for storage of certain of the hash values (as further described below). While described as storing these certain hash values into an array, these values may be stored in any other type of data structure (e.g., list, table, etc.). For each page, the document comparison component 102 traverses the hierarchy tree. If a node of the hierarchy tree has a unique match with a node of a hierarchy tree of a page from the other document, the document comparison component 102 stores the hash value for this node in the data structure for this particular document. Furthermore, the document comparison component 102 does not continue traversing below this uniquely matched node. If a node does not have a unique match to another node in the other document, the document comparison component 102 processes the child nodes of this node. In some example embodiments, the document comparison component 102 traverses the hierarchy tree using a depth-first traversal. For example, the document comparison component 102 processes a parent node, then a child node A, then a grandchild node of child A prior to processing of child node B (a child of the parent node). In other words, the document comparison component 102 traverses down to a leaf node prior to processing laterally across the tree.

In some example embodiments, if the lowest non-leaf node is processed without receiving a unique match, the document comparison component 102 stores (into the array for the document) the hash values of the leaf nodes below the lowest non-leaf node. To illustrate, if node N is a paragraph that uniquely matches a paragraph in the other document, the document comparison component 102 would store the hash value for this node and then not process the nodes below node N. For example, the document comparison component 102 would not process the nodes that might be sentences, words, etc. for this particular paragraph. Accordingly, the document comparison component 102 processes the hierarchy trees for the pages in the page window to generate an array for document A and an array for document B. The arrays will store the hash values for uniquely matched objects and/or hash values at the leaf nodes (for those branches not having unique matches).

Accordingly, in some example embodiments, the document comparison component 102 has created an array of hash values for the pages in the window for document A and an array of hash values for the pages in the window for document B. In some example embodiments, the document comparison component 102 determines differences between the pages in the window of document A and the pages in the window of document B based on these two different arrays. In some example embodiments, the document comparison component 102 may make this determination of differences using the Myers differencing algorithm. In particular, the document comparison component 102 may pass the array of hash values for document A and the array of hash values for document B into the Myers differencing algorithm. The Myers differencing algorithm is described by Eugene W. Myers in the publication "An (O)(ND) Difference Algorithm and Its Variations", which is hereby incorporated by reference. The Myers differencing algorithm outputs a minimal difference path. Such path may be defined as the shortest path through the list of differences, wherein each deletion or addition of an object counts as one and matched objects count as zero. In some embodiments, the Myers differencing algorithm outputs a list of one or more arrays. A first array may include one or more deleted objects from document A. A second array may include one or more inserted objects from document B. A third array may include one or more matching objects from document A and document B. In some example embodiments, contiguous inserted and deleted objects may be combined into a replacement array. Therefore, the Myers differencing algorithm can provide different commands that would enable document A to match document B. For example, the commands may comprise add sentence N from document B at a particular point in document A. Another command may comprise replacing word X from document A with word Y from document B. In some example embodiments, the document comparison component 102 determines which commands are used to update the selected page in the page window for document A.

In certain situations, commands to insert or delete data may be at the beginning or end of the selected page for document A. Accordingly, the document comparison component 102 ensures that these commands are included either in the selected page or the previous/next page (where the data is located between). In some example embodiments, the document comparison component 102 may include the commands that are at the beginning of the selected page for all pages except the last page. The document comparison component 102 may then include the commands at the beginning and end of the selected page if the selected page is the last page. Alternatively, the document comparison component 102 may include the commands that are at the end of the selected page for all pages except the first page. The document comparison component 102 may then include the commands at the beginning and the end of the selected page if the selected page is the beginning page. Accordingly, as described, by processing of page window, the moving of data may be tracked across the pages in the page window (instead of being limited to a page-to-page comparison). The method continues at block 318.

At block 318, the document comparison component 102 outputs any data to be inserted, deleted or replaced from the select page of document A based on the comparison with document B. Accordingly, in some example embodiments, the document comparison component 102 locates the insertion, deletions and replacements for the selected page (not for all pages in the page window). In some example embodiments, the document comparison component 102 outputs the attributes of the data that is being added, deleted or replaced. In some example embodiments, the attributes that are output are those attributes used to create the hash values of components of an electronic document (as described above). For example, in addition to the data itself, the document comparison component 102 may output that that a sentence was underlined; a color of a word changed from black to red; a paragraph moved, etc. The method continues at block 320.

At block 320, the document comparison component 102 determines whether the pages of document A have been processed. In particular, the document comparison component 102 determines whether each of the pages have been marked as the selected page and processed accordingly (as described above). If the pages of document A have been processed, the method at block 321. Otherwise, the method continues at block 322.

At block 321, the document comparison component 102 outputs data to be inserted at the end of document A. As described above, document B may have added data at the end of the last page of document A. The commands that are at the end of the last page of document A are used to output data that was inserted at the end from document B. For example, a user may have added 50 more pages at the end of the electronic document. Accordingly, this operation ensures that the data was added at the end of document B was included (and not outside the page window for document A). The method 300 is complete.

At block 322, the document comparison component 102 determines the page of document B having the most matches to the selected page of document A. As described above, the Myers differencing algorithm may output an array of matching objects. This array of matching objects may be used to determine the most matches between the selected page of document A and one of the pages of document B. Because of the number of changes between document A and document B, a page of document A having the most matches with a page of document B may not be the same page number in the documents. For example, if document B includes a number of additions at page 20, the page of document A most likely to have the most matches may be page 15. Accordingly, determining the most matches may enable the selection of the page for document B to be the page to most likely match the selected page for document A. In some example embodiments, the document comparison component 102 determines matches for objects not at the beginning or end of a page. In some example embodiments, the document comparison component 102 determines matches for the next page beyond the currently selected page. In some example embodiments, the document comparison component 102 may determine a weighted average of the pages in the page window. For example, the center of the page window is given the most weight in the weighted average determination. In some example embodiments, the document comparison component 102 may assign more weight to the pages in the page window after the currently selected page. The document comparison component 102 may determine the page offsets relative to the currently selected page of document B for each of the matching objects. The method continues at block 324.

At block 324, the document comparison component 102 assigns an offset for the selected page of document B for the next page processing of document A, based on the page of document B having the most matches. In some example embodiments, the document comparison component 102 may assign the offset based on the most number of matching objects for a given page. In some example embodiments, the document comparison component 102 may assign the offset based a weighted average using a size of the matching object. In particular, the larger the size of the matching object, the more weight such object receives. For example, a paragraph is assigned more weight than a sentence or a word. The document comparison component 102 then determine the number of pages between the current selected page of document B and the page having the most matches. In some example embodiments, the difference between these two pages is the offset. The method continues at block 326.

At block 326, the document comparison component 102 increments, based on this assigned offset, the selected page of document B. Accordingly, the selected page for document B may move from page 10 to page 15 if the offset were equal to 5. The assigned offset may be a positive or a negative value. In some embodiments, if the assigned offset is a negative value, the assigned offset is set to zero. Accordingly, the selected page for document B does not move backwards. The method continues at block 328.

At block 328, the document comparison component 102 increments, by one, the selected page for document A. For example, if the processed selected page is one, the next selected page is two. The method continues at block 208, where the next selected pages of document A and document B are processed. Accordingly, the method may continue until the pages of document A have been processed.

Figure 5:
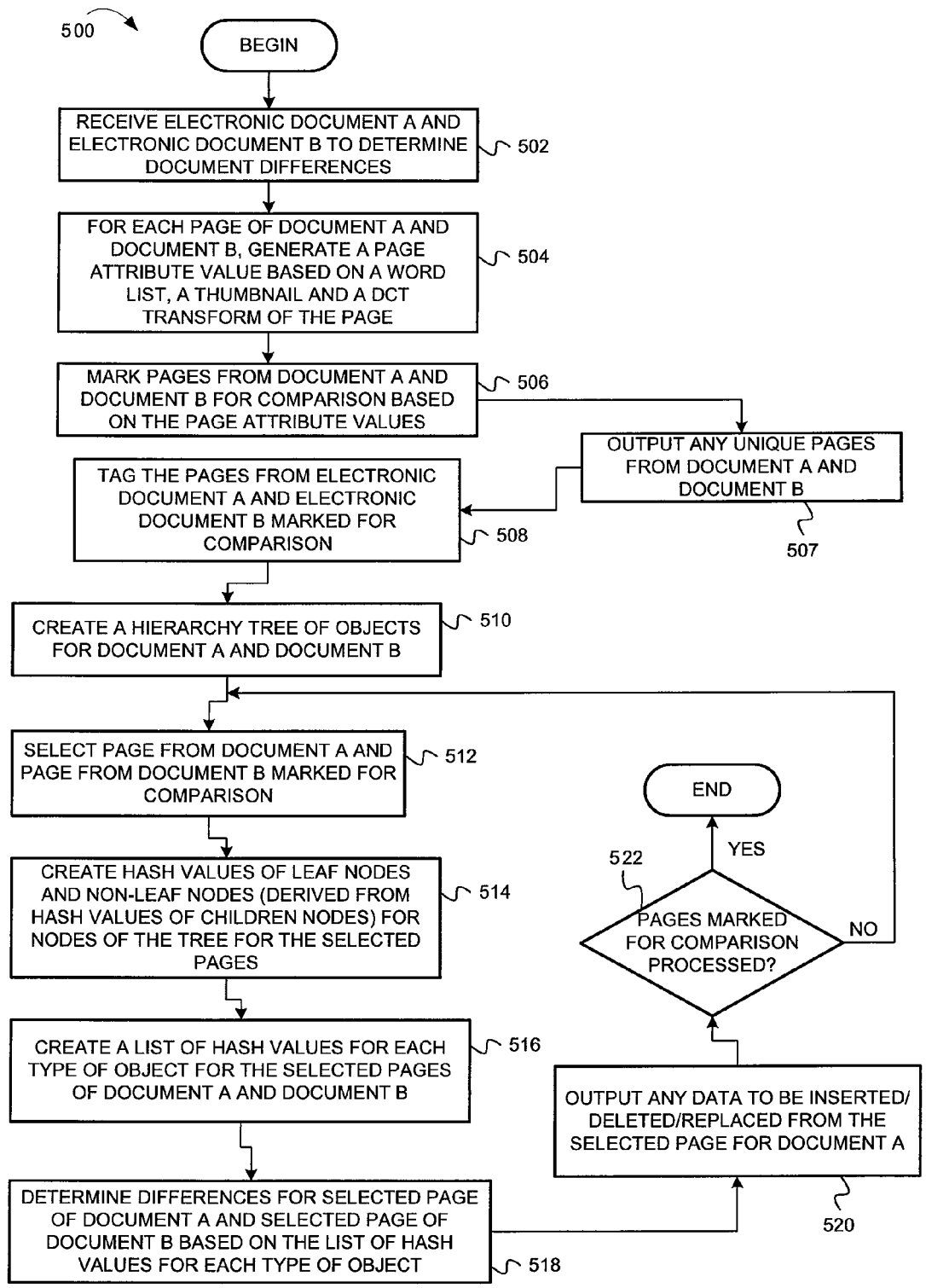
FIG. 5 is a diagram of a method for determining differences between two electronic documents in a single-page mode, according to some example embodiments.

FIG. 5 is a diagram of a method for determining differences between two electronic documents in a single-page mode, according to some example embodiments. A method 500 is described with reference to FIG. 1. In some example embodiments, the method 500 is performed by the document comparison component 102. While described with reference to two electronic documents, in some example embodiments, such operations may be performed on any number of such electronic documents. The method 500 commences at block 502.

At block 502, the document comparison component 102 receives the electronic document A 104 and the electronic document B 106. As described above, these documents may be received from local and/or remote machine-readable media. The method continues at block 504.

At block 504, the document comparison component 102 generates a page attribute value for each page of documents A and B. In some example embodiments, the page attribute value is based on any combination of the following: (1) a list of words (including font size and text) on the page; (2) a thumbnail of the page; and (3) a Discrete Cosine Transform (DCT) transform of the thumbnail. Embodiments are not limited to these attributes of a page for generation of the page attribute value. For example, other types of transforms of the thumbnail may be used, relevant attributes regarding individual figures on the page, the number of words on the page, etc. In some embodiments, the page attribute value is based on a weighted average of these attributes. The method continues at block 506.

At block 506, the document comparison component 102 marks the pages from document A and document B for comparison based on the page attribute values. For example, if the page attribute values for a page from document A and a page from document B are within a given range, these pages are marked for comparison. To illustrate, if the difference in the page attribute values is beyond a given threshold, the document comparison component 102 marks the two pages to be compared to determine differences (as described below). Accordingly, in some example embodiments, there may be C number of paired pages for comparison. For document A and document B, there may be D and E unique pages, respectively. Thus, C+D=M and C+E=N, where M and N are the total number of pages for document A and document B, respectively. In some embodiments, the unique pages (D and E) are marked as final output. The remaining pairs of C pages are then processed (as described below). The method continues at block 507.

At block 507, the document comparison component 102 outputs any unique pages from document A and document B. In particular, the document comparison component 102 outputs those pages that are not matched between document A and document B, as such pages are differences between the two documents. The method continues at block 508.

At block 508, the document comparison component 102 tags the pages that are marked for comparison of the electronic document A and the electronic document B. As described above for the operations of the method 200, in some example embodiments, the document comparison component 102 locates a hierarchical structure of containers for pages of an electronic document. In some example embodiments, as a result of the tagging, the document comparison component 102 outputs a tree that provides a hierarchy structure of different components of an electronic document. For example, the document comparison component 102 may locate headings, paragraphs, sentences, words, images, etc. of an electronic document. In some example embodiments, the document comparison component 102 may perform the tagging and creation of the associated structure tree in accordance with PDF Reference, $6^{th}$ edition, version 1.7, November 2006 from Adobe Systems Inc., which is hereby incorporated by reference. In some example embodiments, the document comparison component 102 may tag individual pages of an electronic document. The method continues at block 510.

At block 510, the document comparison component 102 creates a hierarchy tree of objects for document A and document B. The document comparison component 102 may create the hierarchy tree from the tagging of the electronic document described above (see description above regarding block 206 of FIG. 2). The method continues at block 512.

At block 512, the document comparison component 102 selects one of the pairs of pages marked for comparison between document A and document B. The method continues at block 514.

At block 514, the document comparison component 102 creates hash values for the nodes of the hierarchy tree for the selected pages for document A and document B. As described above, the document comparison component 102 may use any number of different types of hashing operations to create the hash values (such as Message Digest (MD)2, MD4, MD5, Secure Hash Algorithm (SHA), etc.). In some example embodiments, the document comparison component 102 may first create hash values for each of the leaf nodes (words, images, etc. of the document). The hash value may be created from any data that is representative of the leaf node. In some example embodiments, the hash value may be derived from content, attributes, metadata, etc. for the node. For example, for a word, the hash may be derived from the word itself, the font, the color, etc. In some example embodiments, the document comparison component 102 may then derive the hash values for the non-leaf nodes from the hash values of the leaf nodes. Therefore, for a non-leaf node having three leaf nodes, the document comparison component 102 would derive the hash value for the non-leaf node using the hash values for the three leaf nodes. Accordingly, the document comparison component 102 may traverse up the hierarchy tree to create the hash values for the different nodes based on the hash values of child nodes. Therefore, if the hash value for a given page of document A equals the hash value for a given page of document B, it is assumed that these two pages are the same. In some example embodiments, the document comparison component 102 may verify a match of two hash values based on the hash value of the child nodes. The method continues at block 516.

At block 516, the document comparison component 102 creates an ordered list of hash values for the different types of objects for the selected pages for document A and document B. As described above, objects in an electronic document may include word, graphic object, figure, sentence, paragraph, chapter, section, etc. The document comparison component 102 may store the hash values in any type of data structure (e.g., skip list, array, table, etc.).

In some situations, a given object may have small updates therein. For example, only one word in a paragraph may be changed and the paragraph moved. In some example embodiments, the document comparison component 102 may locate such objects. In some example embodiments, the document comparison component 102 processes the non-matching branch objects to see if such objects are near match objects. The document comparison component 102 may traverse the hierarchy tree of document A to locate branch objects in document B, wherein some minimum percentage matching children are located. Accordingly, another object to be tracked may be near match objects (similar to words, sentences, paragraphs, etc.) The method continues at block 518.

At block 518, the document comparison component 102 determines differences for the selected pages between document A and document B based on the list of hash values for each type of object. In some example embodiments, the document comparison component 102 performs a comparison of hash values between the documents starting with the highest level objects. For example, the document comparison component 102 may start with a comparison of hash values for pages between document A and document B. If there is match between two pages, the lower level objects (e.g., paragraphs, sentences, words, etc.) for those two matching pages do not need to be processed. If a given page does not have a match, the document comparison component 102 may then perform a comparison for the next lower level of objects. In some example embodiments, the document comparison component 102 continues comparison of hash values for same type objects for document A and document B for the non-leaf objects (but not the leaf objects). For example, if the leaf objects are words, the document comparison component 102 does not compare the hash values for words between document A and document B.

The document comparison component 102 may then create an array for document A and document B for storage of certain of the hash values (as further described below). While described as storing these certain hash values into an array, these values may be stored in any other type of data structure (e.g., list, table, etc.). For each page, the document comparison component 102 traverses the hierarchy tree. If a node of the hierarchy tree has a unique match with a node of a hierarchy tree of a page from the other document, the document comparison component 102 stores the hash value for this node in the data structure for this particular document. Furthermore, the document comparison component 102 does not continue traversing below this uniquely matched node. If a node does not have a unique match to another node in the other document, the document comparison component 102 processes the child nodes of this node. In some example embodiments, the document comparison component 102 traverses the hierarchy tree using a depth-first traversal. For example, the document comparison component 102 processes a parent node, then a child node A, then a grandchild node of child A prior to processing of child node B (a child of the parent node). In other words, the document comparison component 102 traverses down to a leaf node prior to processing laterally across the tree.

In some example embodiments, if the lowest non-leaf node is processed without receiving a unique match, the document comparison component 102 stores (into the array for the document) the hash values of the leaf nodes below the lowest non-leaf node. To illustrate, if node N is a paragraph that uniquely matches a paragraph in the other document, the document comparison component 102 would store the hash value for this node and then not process the nodes below node N. For example, the document comparison component 102 would not process the nodes that might be sentences, words, etc. for this particular paragraph. Accordingly, the document comparison component 102 processes the hierarchy trees for the selected pages to generate an array for document A and an array for document B. The arrays will store the hash values for uniquely matched objects and/or hash values at the leaf nodes (for those branches not having unique matches).

In some example embodiments, the document comparison component 102 determines differences between the selected pages based on these two different arrays. In some example embodiments, the document comparison component 102 may make this determination of differences using the Myers differencing algorithm. In particular, the document comparison component 102 may pass the array of hash values for document A and the array of hash values for document B into the Myers differencing algorithm (as described above). The method continues at block 520.

At block 520, the document comparison component 102 outputs any data to be inserted, deleted or replaced from the select page of document A based on the comparison with document B. In some example embodiments, the document comparison component 102 outputs the attributes of the data that is being added, deleted or replaced. In some example embodiments, the attributes that are output are those attributes used to create the hash values of components of an electronic document (as described above). For example, in addition to the data itself, the document comparison component 102 may output that that a sentence was underlined; a color of a word changed from black to red; a paragraph moved, etc. The method continues at block 522.

At block 522, the document comparison component 102 determines whether the pairs of pages marked for comparison have been processed. In particular, the document comparison component 102 determines whether each of the pairs of pages have been marked as the selected pages and processed accordingly (as described above). If the pairs of pages have been processed, the method is complete. Otherwise, the method continues at block 512, where another pair of pages are selected for processing.

In some example embodiments, operations for the methods of 300 and 500 may be performed, at least partially, in parallel. For example, the operation at blocks 308 and 310 for selection of pages and page windows for document A and document B may be performed simultaneously, at least in part. In some example embodiments, the result of the methods 300 and 500 may be a list of object differences of any type. The differences may be examined to see if the differences were because of content, attributes, metadata, etc. In some example embodiments, the difference(s) in an object may be provided to the user in different levels of detail. Because each page was individually tagged, the list of object differences may be traced back to the page include any intermediate branches. Therefore, in some example embodiments, the difference can "bubble up" to the highest level. For example, the only difference was that an entire paragraph was in a different font. In some example embodiments, the result may be a difference list that may be viewed in different levels of granularity. For example, one result may be just the different paragraphs. A more detailed result may include detailed information about the differences in that paragraph. Accordingly, some example embodiments are fault tolerant relative to non-matches for non-leaf nodes. In particular, some example embodiments may still determine differences between two electronic documents even though the components that match are at the leaf nodes (words, images, etc.).

Figure 6:
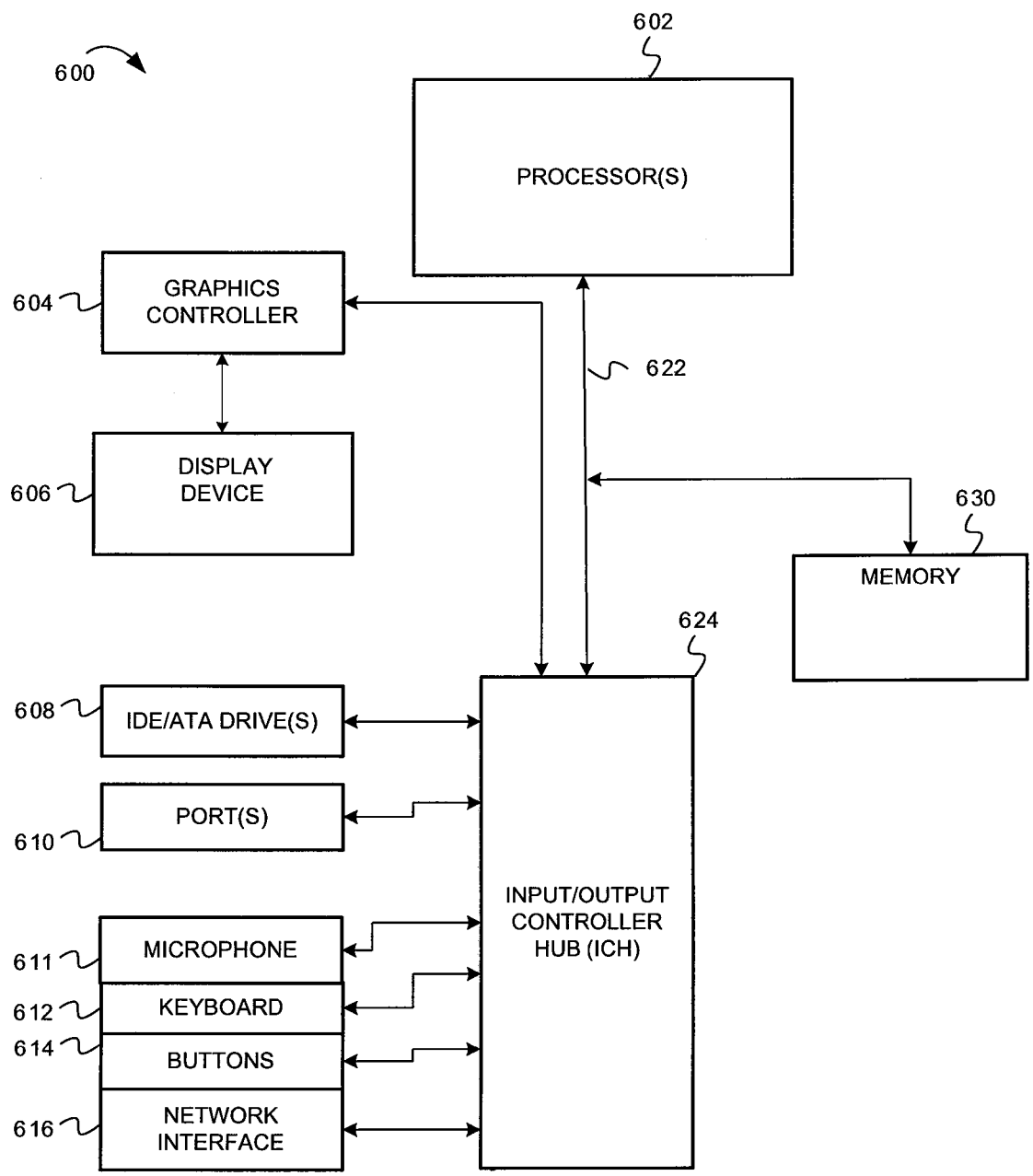
FIG. 6 illustrates a computer that may be used for determining differences between electronic documents, according to some example embodiments.

A detailed block diagram of an example computer environment, according to some embodiments, is now described. In particular, FIG. 6 illustrates a computer that may be used for determining differences between electronic documents, according to some example embodiments. A computer system 600 may be representative of a client device, the server, etc.

As illustrated in FIG. 6, the computer system 600 comprises processor(s) 602. The computer system 600 also includes a memory unit 630, processor bus 622, and Input/Output controller hub (ICH) 624. The processor(s) 602, memory unit 630, and ICH 624 are coupled to the processor bus 622. The processor(s) 602 may comprise any suitable processor architecture. The computer system 600 may comprise one, two, three, or more processors, any of which may execute a set of instructions in accordance with embodiments of the invention.

The memory unit 630 may store data and/or instructions, and may comprise any suitable memory, such as a dynamic random access memory (DRAM). The computer system 600 also includes IDE drive(s) 608 and/or other suitable storage devices. A graphics controller 604 controls the display of information on a display device 606, according to some embodiments of the invention.

The input/output controller hub (ICH) 624 provides an interface to I/O devices or peripheral components for the computer system 600. The ICH 624 may comprise any suitable interface controller to provide for any suitable communication link to the processor(s) 602, memory unit 630 and/or to any suitable device or component in communication with the ICH 624. For one embodiment of the invention, the ICH 624 provides suitable arbitration and buffering for each interface.

For some embodiments of the invention, the ICH 624 provides an interface to one or more suitable integrated drive electronics (IDE) drives 608, such as a hard disk drive (HDD) or compact disc read only memory (CD ROM) drive, or to suitable universal serial bus (USB) devices through one or more USB ports 610. For one embodiment, the ICH 624 also provides an interface to a keyboard 612, a mouse 614, a CD-ROM drive 618, one or more suitable devices through one or more Firewire ports 616. For one embodiment of the invention, the ICH 624 also provides a network interface 620 though which the computer system 600 can communicate with other computers and/or devices.

In some embodiments, the computer system 600 includes a machine-readable medium that stores a set of instructions (e.g., software) embodying any one, or all, of the methodologies for described herein. Furthermore, software may reside, completely or at least partially, within memory unit 630 and/or within the processor(s) 602.

In the description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention include features, methods or processes that may be embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In example embodiments, a machine-readable medium includes volatile and/or non-volatile media (e.g., read only memory (ROM), random access memory (RAM), magnetic disk storage media, optical storage media, flash memory devices, etc.).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include software, data processing hardware, data processing system-implemented methods, and various processing operations, further described herein.

In view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto. Therefore, the specification and drawings are to be regarded in an illustrative rather than a restrictive sense.

What is claimed is:

1. A computerized method comprising:
   receiving a first electronic document and a second electronic document;
   determining a mode type for the first and second electronic documents, the mode type being one of single-page mode or continuous mode, wherein determining a mode type includes:
      determining a type of application that created the first and second electronic documents; and
      determining if there is a repeated pattern for one or more data or attributes for a number of pages of the first and second electronic documents;
   determining a difference between the first electronic document and the second electronic document according to the determined mode type based on matching of a component of the first electronic document to a component of the second electronic document in a hierarchical order; and
   storing the difference in a non-transitory machine-readable storage medium.

2. The computerized method of claim 1, wherein determining the difference between the first electronic document and the second electronic document comprises:
   generating a hash value for the component of the first electronic document and a hash value for the component of the second electronic document; and
   comparing the hash values for the components to determine whether the components match.

3. The computerized method of claim 2, wherein the hash value for the component of the first electronic document and the hash value for the component of the second electronic document are derived from an attribute of the component, wherein the attribute is at least one of text, size of font of text, color of text, and metadata.

4. The computerized method of claim 1, wherein matching of components of the first electronic document and the second electronic document in the hierarchical order comprises matching of components in a top-down hierarchical order.

5. The computerized method of claim 1, wherein a type for the component of the first electronic document and the component of the second electronic document is at least one of a section, a chapter, a paragraph, a sentence, a figure, and a word.

6. The computerized method of claim 1, wherein determining the difference between the first electronic document and the second electronic document comprises determining the difference of a first page of the first electronic document and a second page of the second electronic document.

7. The computerized method of claim 6, wherein the matching of the component of the first electronic document to a component of the second electronic document comprises matching the component in a page window that includes the first page with the component in a page window that includes the second page.

8. The computerized method of claim 7, wherein the second page is selected based on a number of matches between a previous matching of the component in a page window that includes the first page with the component in the page window that includes the second page.

9. The computerized method of claim 7, wherein the second page is selected based on a weighted average of the number of matches.

10. An apparatus comprising:
a non-transitory machine-readable storage medium to store a first electronic document and a second electronic document; and
a document comparison component to:
  determine a mode type for the first and second electronic documents, the mode type being one of single-page mode or continuous mode, wherein determining a mode type includes:
    determining a type of application that created the first and second electronic documents; and
    determining if there is a repeated pattern for one or more data or attributes for a number of pages of the first and second electronic documents;
  determine a difference between the first electronic document and the second electronic document according to the determined mode type based on an operation to match of a component of the first electronic document to a component of the second electronic document in a top-down hierarchical order.

11. The apparatus of claim 10, wherein the component of the first electronic document and the component of the second electronic document are of a same type.

12. The apparatus of claim 10, wherein a type for the component of the first electronic document and the component of the second electronic document is at least one of a section, a chapter, a paragraph, a sentence, a figure, and a word.

* * * * *